(12) United States Patent
Hanawa et al.

(10) Patent No.: US 9,789,923 B2
(45) Date of Patent: Oct. 17, 2017

(54) HYBRID POWER UNIT

(71) Applicant: HONDA MOTOR CO., LTD., Tokyo (JP)

(72) Inventors: Kaoru Hanawa, Wako (JP); Kazuyuki Nakai, Wako (JP); Yoshitaka Nukada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/273,874

(22) Filed: Sep. 23, 2016

(65) Prior Publication Data
US 2017/0088213 A1    Mar. 30, 2017

(30) Foreign Application Priority Data
Sep. 30, 2015   (JP) .................................. 2015-194095

(51) Int. Cl.
*B62B 3/02* (2006.01)
*B62K 5/027* (2013.01)
(Continued)

(52) U.S. Cl.
CPC ................ *B62K 5/027* (2013.01); *B60K 6/38* (2013.01); *B60K 6/48* (2013.01); *B60K 6/50* (2013.01);
(Continued)

(58) Field of Classification Search
CPC . B60K 6/20; B60K 6/38; B60K 6/387; B60K 6/405; B60K 6/40; B60K 6/42;
(Continued)

(56) References Cited

U.S. PATENT DOCUMENTS

| 6,109,383 A * | 8/2000 | Matsuto | B60K 6/24 |
| | | | 180/220 |
| 2010/0236856 A1* | 9/2010 | Nomura | B60K 6/40 |
| | | | 180/292 |

(Continued)

FOREIGN PATENT DOCUMENTS

| EP | 2556977 A1 | 2/2013 |
| JP | 2011-073627 A | 4/2011 |
| JP | 2013067252 A | 4/2013 |

*Primary Examiner* — Erez Gurari
(74) *Attorney, Agent, or Firm* — Birch, Stewart, Kolasch & Birch, LLP

(57) ABSTRACT

A hybrid power unit is mounted on a vehicle body frame of a saddle-type vehicle and is composed of an engine, a transmission, a clutch system, that enables switching between connection and disconnection of power transmission between a crankshaft and the transmission, and an electric motor capable of transmitting rotational power to the transmission. An operation of the electric motor alone is enabled with alleviation of the load. Thus, an increase in the size in the direction along the axis line of the crankshaft is avoided. The electric motor, rendered incapable of direct power transmission from and to a crankshaft, is housed in a transmission chamber so as to be allowed to transmit rotational power from a rotor of the electric motor to a transmission shaft. The rotor is disposed on an upper side relative to the highest oil level of lubricating oil in the transmission chamber.

20 Claims, 8 Drawing Sheets

(51) Int. Cl.
*B60K 6/38* (2007.10)
*B60K 6/48* (2007.10)
*B60K 6/50* (2007.10)
*B62K 5/05* (2013.01)
*B62M 7/02* (2006.01)
*B62M 23/02* (2010.01)

(52) U.S. Cl.
CPC ............... *B62K 5/05* (2013.01); *B62M 7/02* (2013.01); *B62M 23/02* (2013.01); *B60K 2006/4825* (2013.01); *B62K 2700/22* (2013.01)

(58) Field of Classification Search
CPC . B60K 6/46; B62K 5/027; B62K 5/05; B62K 6/40; B62K 2204/00; B62M 23/02
See application file for complete search history.

(56) References Cited

U.S. PATENT DOCUMENTS

| | | | | |
|---|---|---|---|---|
| 2010/0243348 | A1* | 9/2010 | Nomura | B60K 6/365 180/65.22 |
| 2012/0318601 | A1* | 12/2012 | Kuroki | B60K 6/48 180/220 |
| 2013/0081895 | A1* | 4/2013 | Nomura | B60K 6/40 180/220 |
| 2013/0270038 | A1* | 10/2013 | Nitta | B62K 11/04 184/6 |
| 2017/0088213 | A1* | 3/2017 | Hanawa | B60K 6/38 |

\* cited by examiner

HYBRID POWER UNIT

CROSS-REFERENCE TO RELATED APPLICATIONS

The present application claims priority under 35 USC 119 to Japanese Patent Application No. 2015-194095 filed Sep. 30, 2015 the entire contents of which are hereby incorporated by reference.

BACKGROUND OF THE INVENTION

1. Field of the Invention

The present invention relates to a hybrid power unit that is mounted on a vehicle body frame of a saddle-type vehicle and includes an engine having a crankcase that rotatably supports a crankshaft, a transmission that has a transmission shaft parallel to the crankshaft and is housed in a transmission chamber formed in the crankcase below the crankshaft, a clutch system that enables switching between connection and disconnection of power transmission from the crankshaft to the transmission shaft, and an electric motor capable of transmitting rotational power to the transmission shaft.

2. Description of Background Art

A hybrid motorcycle is known wherein a hybrid power unit having an engine and an electric motor is mounted on a vehicle body frame. See, for example, Japanese Patent Laid-Open No. 2011-73627.

However, in the hybrid power unit disclosed in the above-mentioned Japanese Patent Laid-Open No. 2011-73627, the electric motor is directly joined to the crankshaft of the engine coaxially. Thus, when an operation by the electric motor alone is attempted, the engine is dragged and the load becomes large. For this reason, it has been a challenge to effectively set use at the best point of the motor efficiency and enlarge the range in which the efficiency is favorable.

It is conceivable that, in order to solve such a problem, the rotational power from the electric motor rendered incapable of direct power transmission from and to the crankshaft is transmitted to the transmission shaft of the transmission. However, when the electric motor is disposed coaxially with the transmission shaft, the crankcase becomes large toward the lower side and the vehicle height of the saddle-type vehicle becomes high. For this reason, it is required to dispose the rotation axis line of the electric motor on the upper side relative to the transmission shaft and a power transmission mechanism needs to be provided between the electric motor and the transmission shaft. In this case, the power transmission mechanism bears a comparatively-large load and thus needs to be lubricated and it is conceivable that the power transmission mechanism is lubricated by lubricating oil in the transmission chamber in which the transmission is housed. However, if part of the rotor of the electric motor soaks in the lubricating oil, rotation resistance arises, which causes the lowering of the efficiency. Thus, it is also conceivable that separation between the electric motor and the power transmission mechanism is made by a wall through which a motor shaft that is coaxially continuous with the rotor is made to liquid-tightly penetrate. However, this causes a problem wherein the size of the hybrid power unit increases in the direction along the axis line of the crankshaft.

SUMMARY AND OBJECTS OF THE INVENTION

The present invention is made in view of such circumstances and an object of an embodiment of the present invention is to provide a hybrid power unit that allows for the operation of an electric motor alone with alleviation of the load and allows also for an avoidance of a size increase in the direction along the axis line of a crankshaft.

In order to achieve the above-described object, in an embodiment of the present invention a hybrid power unit is mounted on a vehicle body frame of a saddle-type vehicle. The hybrid power unit includes an engine having a crankcase that rotatably supports a crankshaft, a transmission that has a transmission shaft parallel to the crankshaft and is housed in a transmission chamber formed in the crankcase below the crankshaft, a clutch system that enables switching between connection and disconnection of power transmission from the crankshaft to the transmission shaft, and an electric motor capable of transmitting rotational power to the transmission shaft. The electric motor, rendered incapable of direct power transmission from and to the crankshaft, is housed in the transmission chamber in such a manner so as to be allowed to transmit rotational power from a rotor of the electric motor to the transmission shaft, and the rotor is disposed on the upper side relative to a highest oil level of lubricating oil in the transmission chamber.

According to an embodiment of the present invention, the electric motor is disposed on the same axis as the crankshaft extending in the vehicle front-rear direction.

According to an embodiment of the present invention, the electric motor is mounted on the vehicle body frame of the saddle-type vehicle having a pair of left and right front wheels in such a manner so as to be located on a center line that passes through a central part between the pair of left and right front wheels in plan view and extends in the vehicle front-rear direction and is located on the front side of the crankshaft in the vehicle front-rear direction.

According to an embodiment of the present invention, the saddle-type vehicle is a front-two-wheel motor-tricycle that is swingable to left and right, and the rotor is disposed on the upper side relative to a highest oil level in the transmission chamber when the front-two-wheel motor-tricycle swings.

According to an embodiment of the present invention, the rotor is supported by an engine constituent member forming part of the engine.

According to an embodiment of the present invention, the engine constituent member is the crankshaft, and a motor shaft coaxially continuous with the rotor to rotate with the rotor is relatively rotatably supported by an end part of the crankshaft.

According to an embodiment of the present invention, the motor shaft is relatively rotatably supported by a front end part of the crankshaft extending in the vehicle front-rear direction.

According to an embodiment of the present invention, the engine constituent member is the crankcase, and a motor shaft, coaxially continuous with the rotor to rotate with the rotor, is rotatably supported by a rotor support part formed in the crankcase at a position separated from one end part of the crankshaft in the axial direction. Furthermore, drive sprockets that drive cam chains are fixed to the one end part of the crankshaft.

According to an embodiment of the present invention, a stator of the electric motor is fixed to a motor case joined to the crankcase, and couplers for guiding leads continuous with the stator from the motor case to the outside are disposed to protrude outward from a sidewall of the motor case on the upper side relative to the highest oil level of the lubricating oil in the transmission chamber.

According to an embodiment of the present invention, rotational power from the rotor of the electric motor, rendered incapable of direct power transmission from and to the crankshaft, is transmitted to the transmission shaft, and switching between connection and disconnection of power transmission of the crankshaft and the transmission shaft can be carried out by the clutch system. Therefore, by transmitting power from the electric motor to the transmission shaft in the state in which the power transmission between the crankshaft and the transmission shaft is blocked, the occurrence of dragging of the engine at the time of operation by the electric motor alone can be avoided. In addition, when a connection is established between the crankshaft and the transmission shaft and operation is carried out by the engine alone, it is also possible to prevent generation of cogging torque on the side of the electric motor by taking measures such as zero-torque control of the electric motor and the provision of a one-way clutch between the transmission shaft and the electric motor. Thus, it is possible to operate the electric motor and the engine alone with an alleviation of the load. Moreover, the electric motor is housed in the transmission chamber and the rotor is disposed on the upper side relative to the highest oil level of the lubricating oil in the transmission chamber. Thus, lubrication of a mechanism that transmits power between the rotor and the transmission shaft is enabled and the need for a wall that isolates the electric motor from the transmission chamber is eliminated. This can avoid an increase in the size of the hybrid power unit in the direction along the axis line of the crankshaft to avoid a stirring of the lubricating oil by the rotor, which can alleviate the load of the electric motor.

According to an embodiment of the present invention, the electric motor exists on the same axis as the crankshaft extending in the vehicle front-rear direction. Thus, the width of the hybrid power unit along the vehicle width direction is suppressed to a small width, which allows the saddle-type vehicle to be made compact.

According to an embodiment of the present invention, the electric motor is located on the center line passing through the central part between the pair of left and right front wheels in a plan view and is disposed on the front side of the crankshaft in the vehicle front-rear direction. Thus, the electric motor can be cooled by a flow of air when the saddle-type vehicle is operated.

According to an embodiment of the present invention, the rotor is disposed on the upper side relative to the highest oil level of the lubricating oil in the transmission chamber when the front-two-wheel motor-tricycle swings to the left and right. Thus, stirring of the lubricating oil by the rotor is avoided when the front-two-wheel motor-tricycle swings to the left and right, and can alleviate the load of the electric motor.

According to an embodiment of the present invention, the rotor, as a heavy component, can be supported by the engine constituent member having a high rigidity.

According to an embodiment of the present invention, the motor shaft, coaxially continuous with the rotor, is relatively rotatably supported by the end part of the crankshaft. Thus, with the motor shaft supported by the crankshaft having a particularly-high rigidity, the rotor can be supported by a simple configuration without the necessity to additionally provide a support member.

According to an embodiment of the present invention, the motor shaft is relatively rotatably supported by the front end part of the crankshaft and thus the electric motor can be cooled by a flow of air.

According to an embodiment of the present invention, the motor shaft is rotatably supported by the rotor support part formed in the crankcase at a position separated from the one end part of the crankshaft in the axial direction. Thus, the rotor as a heavy component can be supported by the crankcase having a particularly-high rigidity. In addition, the one end part of the crankshaft can be formed with a small radius by being rendered irrelevant to the support of the rotor. This allows the drive sprockets provided at the one end part of the crankshaft for driving the cam chains to have a small radius to thus avoid an increase in the radius of driven sprockets due to an increase in the radius of the drive sprockets. Thus, the hybrid power unit can be made compact and hence the saddle-type vehicle can be made compact.

According to an embodiment of the present invention, the couplers for guiding the leads continuous with the stator from the motor case to the outside protrude outward from the sidewall of the motor case on the upper side relative to the highest oil level of the lubricating oil in the transmission chamber. Thus, leakage of the lubricating oil from between the motor case and the couplers can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below with reference to the accompanying drawings. In the following description, the respective directions of front, rear, upward, downward, left, and right directions refer to the directions as viewed from the operator riding a front-two-wheel motor-tricycle.

A first embodiment of the present invention will be described with reference to FIG. 1 to FIG. 6. First, referring to FIG. 1 and FIG. 2, this saddle-type vehicle is a front-two-wheel motor-tricycle that has a pair of left and right front wheels WF and can swing to the left and right. A hybrid power unit PA that drives a rear wheel WR is mounted at the intermediate part of a vehicle body frame F of the front-two-wheel motor-tricycle in the vehicle front-rear direction. A rider seat 12 that carries a rider who operates a steering handlebar 11 steerably supported at the front end part of the vehicle body frame F is supported by the vehicle body frame F in such a manner so as to be disposed on the obliquely upper rear side of the power unit PA.

Figure 1:
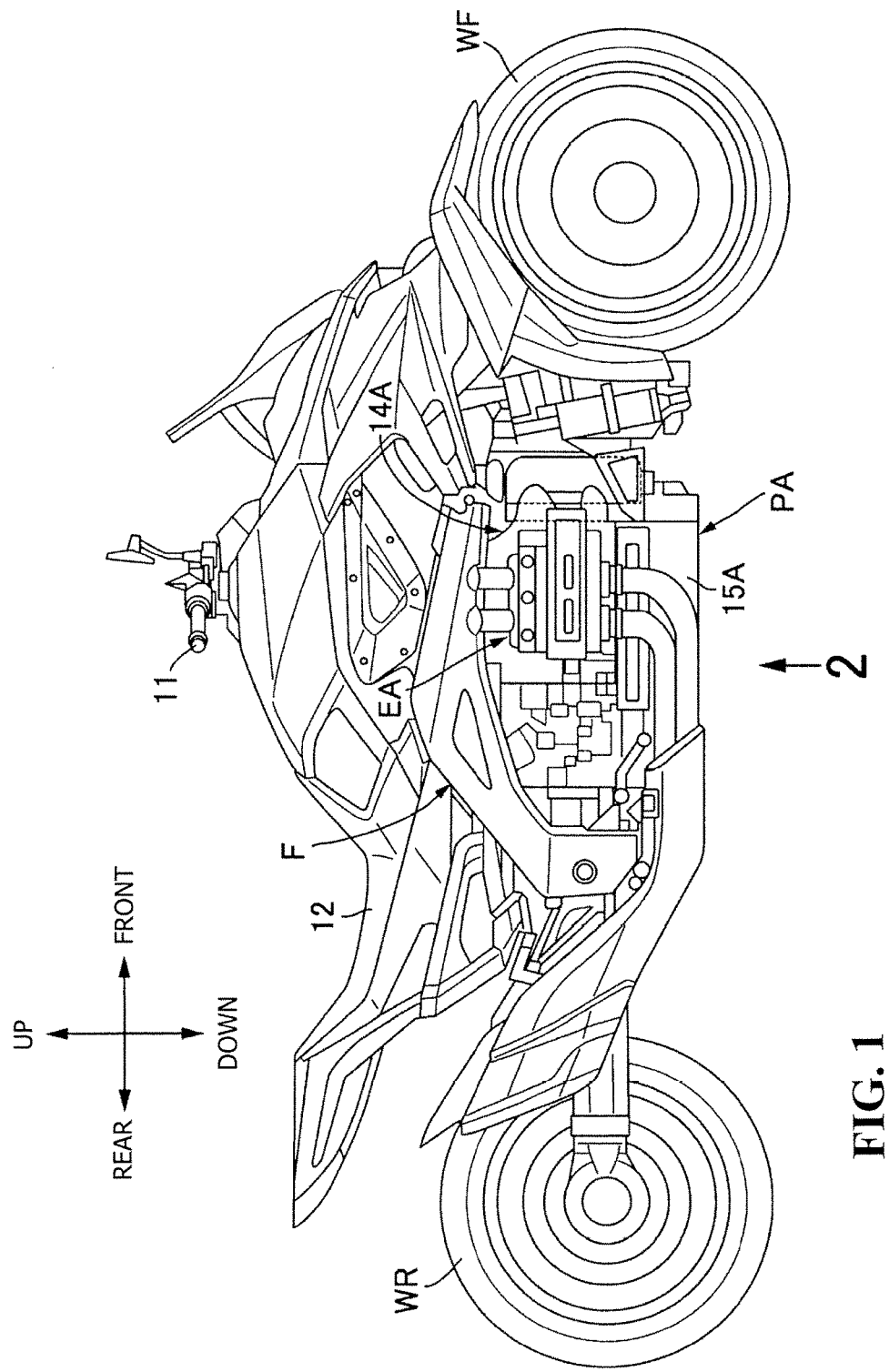
FIG. 1 is a right side view of a front-two-wheel motor-tricycle of a first embodiment.
Figure 2:
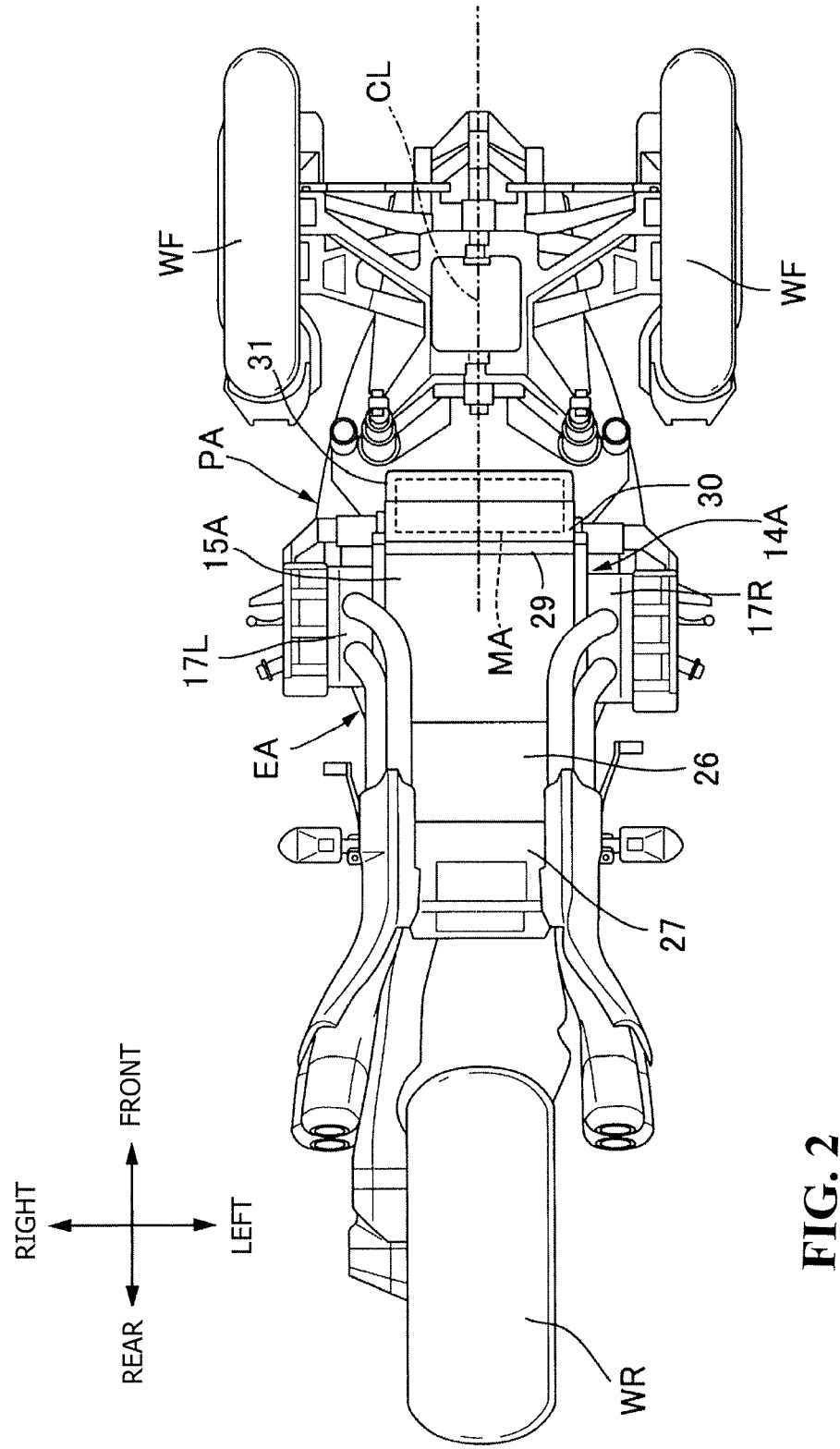
FIG. 2 is a bottom view as viewed in a direction of arrow 2 in FIG. 1.
Figure 3:
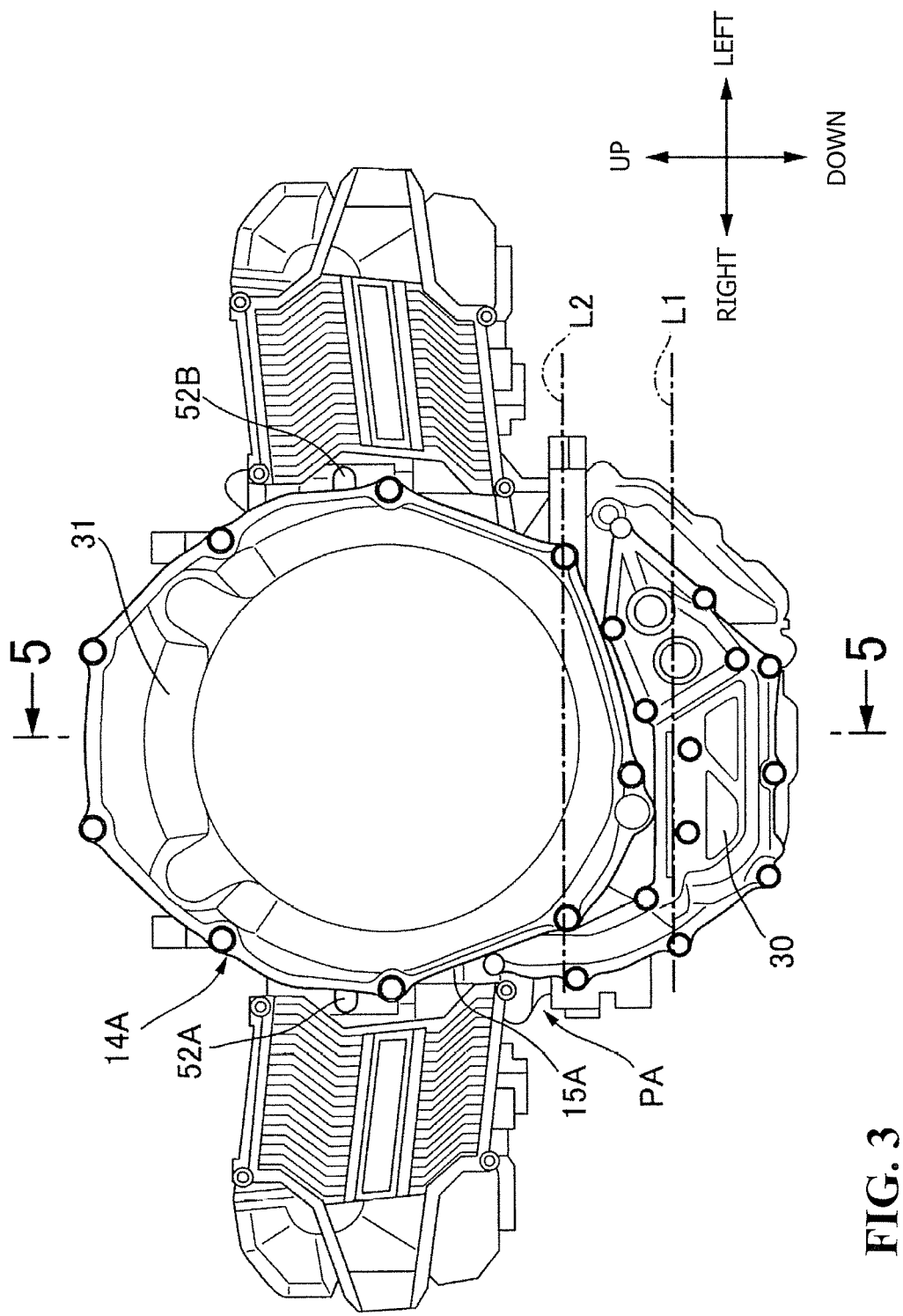
FIG. 3 is a front view of a hybrid power unit.
Figure 4:
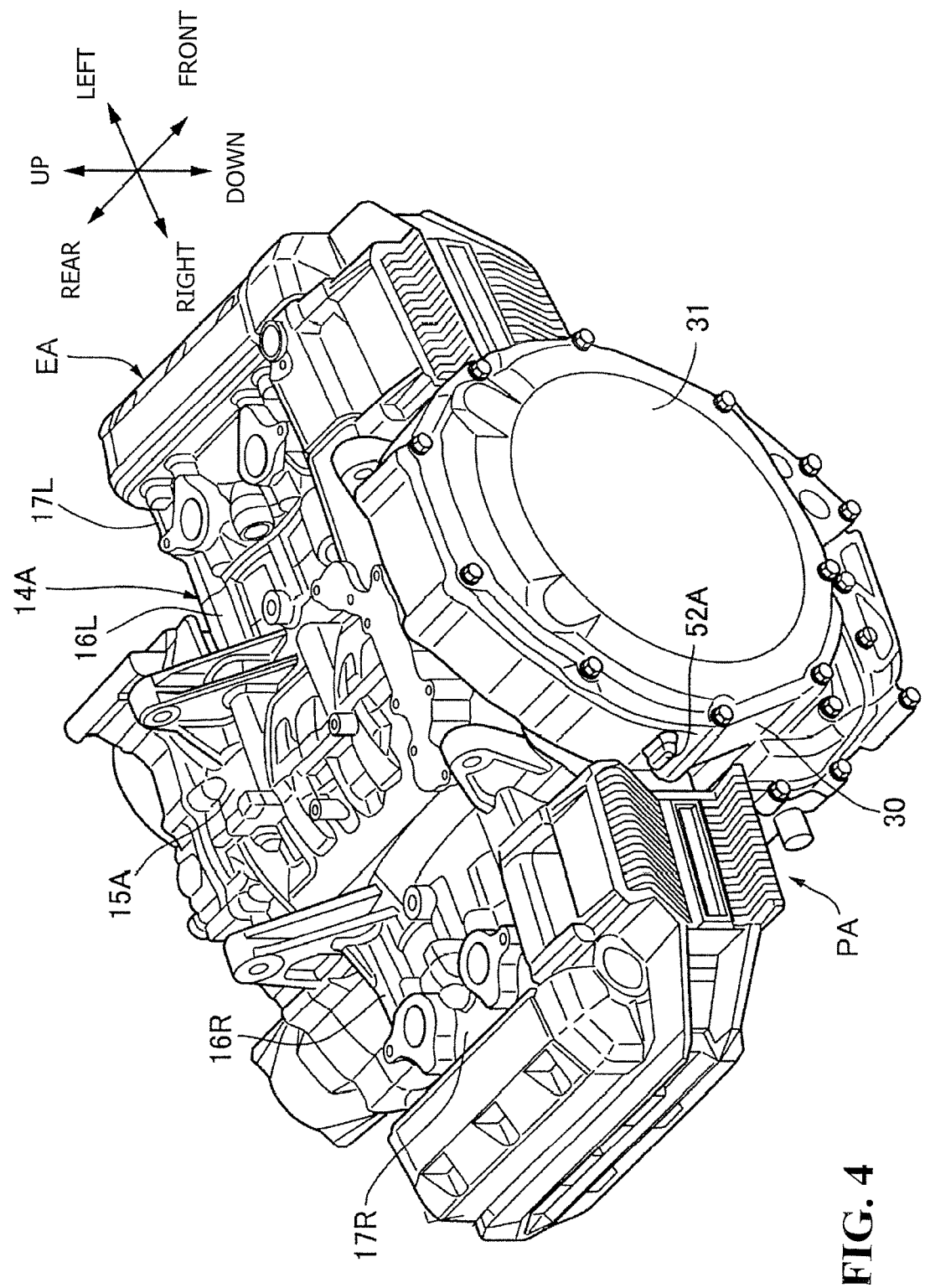
FIG. 4 is a perspective view of the hybrid power unit.
Figure 5:
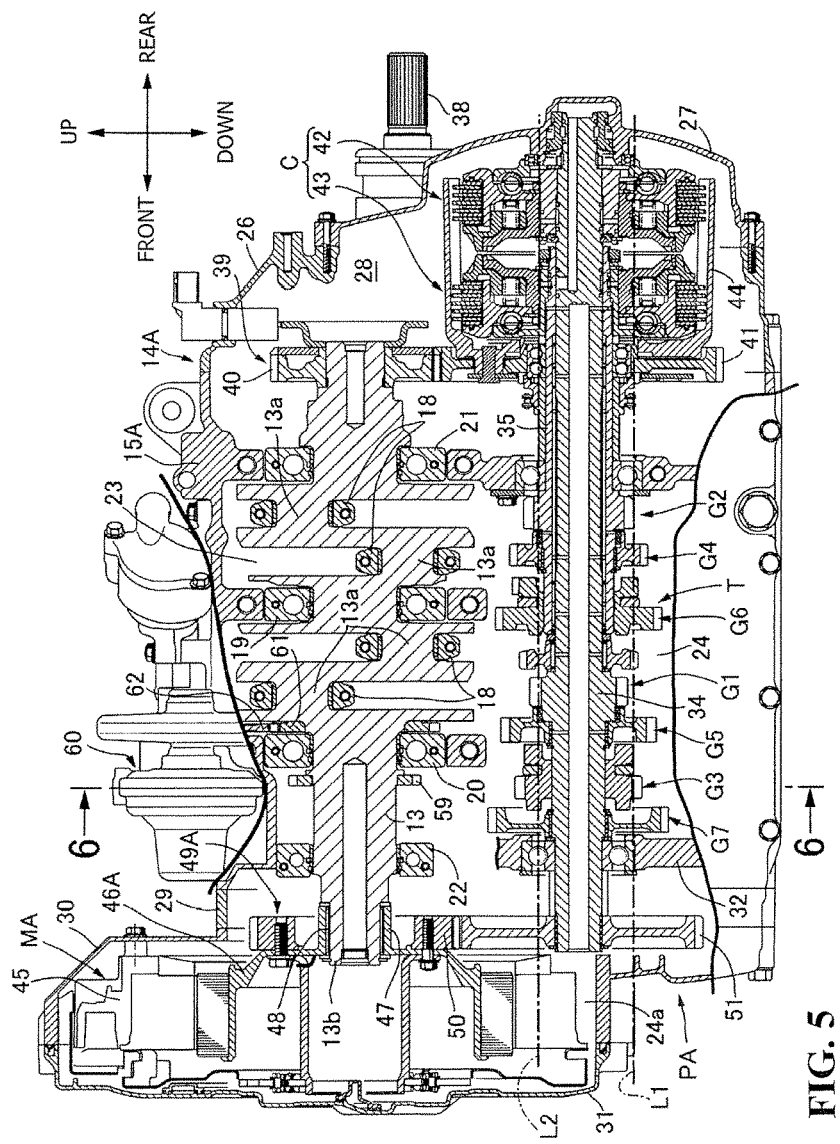
FIG. 5 is a sectional view along line 5-5 in FIG. 3.

Referring also to FIG. 3 to FIG. 5, the hybrid power unit PA includes an engine EA having a crankcase 15A that rotatably supports a crankshaft 13 extending in the vehicle front-rear direction, a transmission T housed in the crankcase 15A below the crankcase 13, and a clutch system C that enables switching between connection and disconnection of power transmission from the crankshaft 13 to the transmission T, and an electric motor MA.

The engine EA is a horizontally-opposed four-cylinder engine in this embodiment. An engine main body 14A thereof includes the crankcase 15A, a left cylinder block 16L that protrudes from the crankcase 15A to the left side in the vehicle width direction, a left cylinder head 17L that sandwiches this left cylinder block 16L with the crankcase 15A, a right cylinder block 16R that protrudes from the crankcase 15A to the right side in the vehicle width direction, and a right cylinder head 17R that sandwiches the right cylinder block 16R with the crankcase 15A. Each of the pair of the left cylinder block 16L and the left cylinder head 17L and the pair of the right cylinder block 16R and the right cylinder head 17R is configured to include two cylinders.

Referring to FIG. 5 particularly, the crankshaft 13 is formed to have four crankpins 13a adjacent in the axial direction in such a manner that connecting rods 18 continuous with the pistons (not shown) of the four cylinders are connected to the crankpins 13a. The crankshaft 13 is rotatably supported by the crankcase 15A and the following bearing caps, a bearing cap 19 that is disposed between a pair of crankpins 13a at the intermediate part in the axial direction of the crankshaft 13 among the four crankpins 13a and is fastened to the crankcase 15A; a pair of bearing caps 20 and 21 fastened to the crankcase 15A at such positions so as to each sandwich a respective one of pairs of crankpins 13a with the bearing cap 19; and a bearing cap 22 that is disposed on the front side relative to the bearing cap 20 at the frontmost end in the vehicle front-rear direction among the bearing caps 19 to 21 and is fastened to the crankcase 15A.

In the crankcase 15A, a crank chamber 23 that houses a large part of the crankshaft 13 and a transmission chamber 24 disposed below the crankshaft 13 to lead to the crank chamber 23 are formed.

A rear part extension case 26 extending rearward is joined to the rear end part of the crankcase 15A in the vehicle front-rear direction and a clutch cover 27 that seals a rear end opening of this rear part extension case 26 is joined to the rear end of the rear part extension case 26. The crank chamber 23 and a clutch chamber 28 disposed on the rear side of the transmission chamber 24 are formed by the crankcase 15A, the rear part extension case 26, and the clutch cover 27.

Furthermore, a front part extension case 29 extending forward is joined to the front end part of the crankcase 15A in the vehicle front-rear direction and a motor case 30 extending forward is joined to the front end part of this front part extension case 29. A motor cover 31 that closes a front end opening of this motor case 30 is joined to the front end part of the motor case 30. The front part extension case 29, the motor case 30, and the motor cover 31 form a motor housing part 24a forming part of the transmission chamber 24. In this embodiment, a front wall 32 of the crankcase 15A intervenes between the motor housing part 24a and the crank chamber 23 and the transmission chamber 24. However, the lower part of the front wall 32 is formed to allow the flowing and passing of lubricating oil in the transmission chamber 24 and the motor housing part 24a forms part of the transmission chamber 24.

Figure 6:
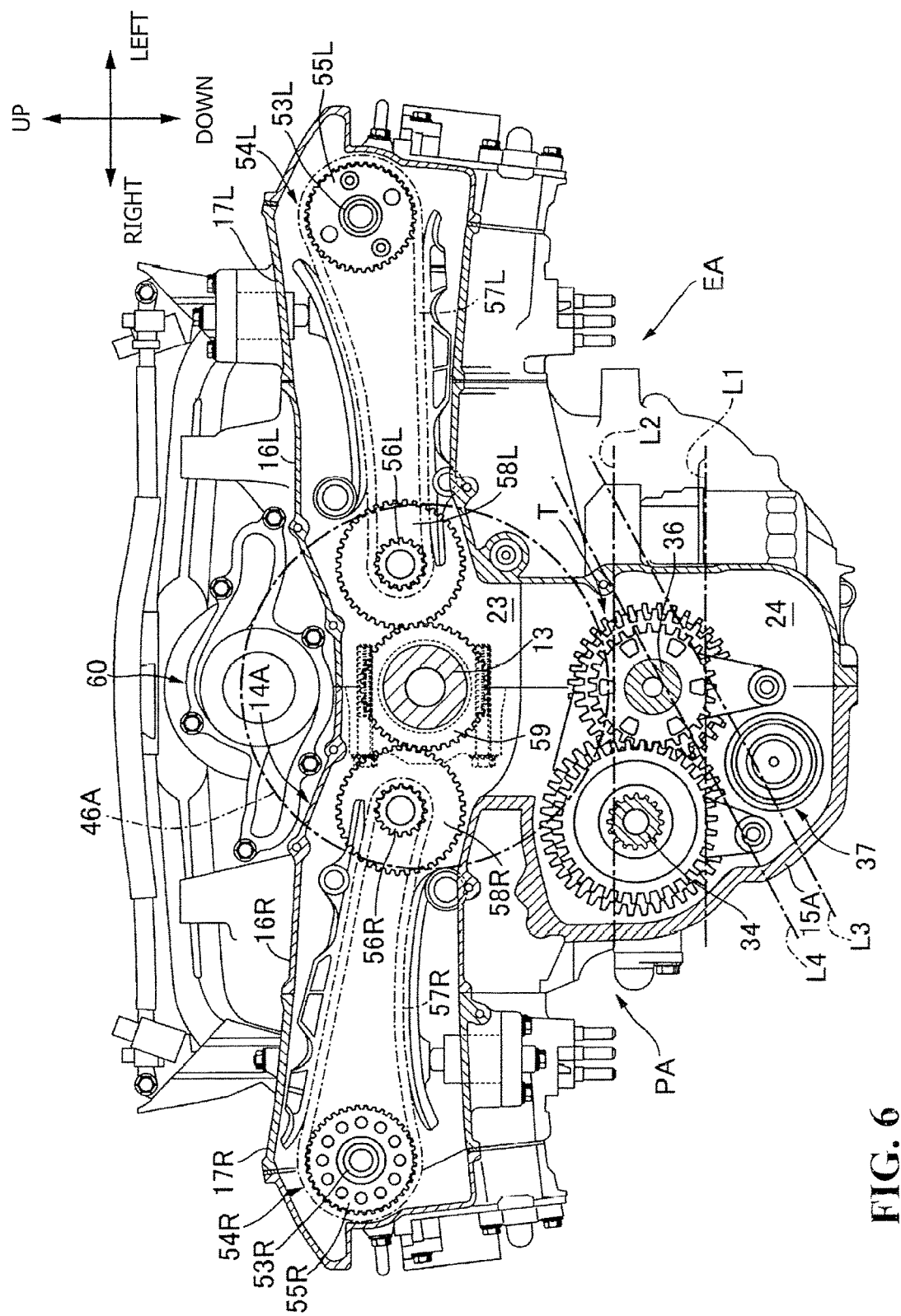
FIG. 6 is a sectional view along line 6-6 in FIG. 5.

Referring also to FIG. 6, the transmission T housed in the transmission chamber 24 includes the following components, a first main shaft 34 as a transmission shaft rotatably supported by the crankcase 15A; a second main shaft 35 in which the first main shaft 34 is inserted coaxially and relatively rotatably; a countershaft 36 extending in parallel to the first and second main shafts 34 and 35; gear trains of odd shift stages provided between the first main shaft 34 and the countershaft 36 in such a manner that one gear train can be solely established. More specifically, e.g. a first gear train G1, a third gear train G3, a fifth gear train G5, and a seventh gear train G7; gear trains of even shift stages provided between the second main shaft 35 and the countershaft 36 in such a manner that one gear train can be solely established. More specifically, e.g. a second gear train G2, a fourth gear train G4, and a sixth gear train G6; and a gear selection mechanism 37 that selects one of the first to seventh gear trains G1 to G7.

The first main shaft 34 is rotatably supported by the crankcase 15A and the clutch cover 27 and the axially-intermediate part of the second main shaft 35, which coaxially surrounds the first main shaft 34, is rotatably supported by the crankcase 15A.

To the rear wheel WR, rotational power is transmitted from an output shaft 38 that has an axis line along the vehicle front-rear direction and protrudes rearward from the clutch cover 27. To the output shaft 38, rotational power is transmitted from the countershaft 36.

In the clutch chamber 28, a primary reduction gear 39 that transmits power from the crankshaft 13 and the clutch system C provided between the primary reduction gear 39 and the first and second main shafts 34 and 35 are housed.

The primary reduction gear 39 is composed of a drive gear 40 that rotates with the crankshaft 13 and a driven gear 41 disposed coaxially with the first and second main shafts 34 and 35 to mesh with the drive gear 40.

The clutch system C is composed of a first clutch 42 provided between the driven gear 41 and the first main shaft 34 and a second clutch 43 provided between the driven gear 41 and the second main shaft 35. The first and second clutches 42 and 43 are hydraulic multi-plate clutches having in common a clutch outer 44 joined to the driven gear 41 in such a manner so as to be incapable of relative rotation to the driven gear 41.

When the first clutch 42 becomes the power transmitting state, rotational power from the crankshaft 13 is transmitted to the first main shaft 34 via the primary reduction gear 39 and the first clutch 42. When the second clutch 43 becomes the power transmitting state, rotational power from the crankshaft 13 is transmitted to the second main shaft 35 via the primary reduction gear 39 and the second clutch 43.

When the first clutch 42 is in the power transmitting state and power is being transmitted from the crankshaft 13 to the first main shaft 34, the power can be transmitted from the first main shaft 34 to the countershaft 36 via one gear train solely established among the first, third, fifth, and seventh gear trains G1, G3, G5, and G7. When the second clutch 43 is in the power transmitting state and power is being transmitted from the crankshaft 13 to the second main shaft 35, the power can be transmitted from the second main shaft 35 to the countershaft 36 via one gear train solely established among the second, fourth, and sixth gear trains G2, G4, and G6.

Furthermore, when the first and second clutches 42 and 43 are in the state in which power transmission is blocked, the rotational power is not transmitted from the crankshaft 13 to the first and second main shafts 34 and 35.

The electric motor MA has a stator 45 fixed to the motor case 30 and a rotor 46A disposed in the stator 45. The electric motor MA is disposed on the upper side relative to the first main shaft 34 and in the motor housing part 24a in the transmission chamber 24 while being rendered incapable of direct power transmission from and to the crankshaft 13.

The electric motor MA is disposed on the same axis as the crankshaft 13 extending in the vehicle front-rear direction and on the front side of the crankshaft 13 in the vehicle front-rear direction. In addition, as clearly shown in FIG. 2, the electric motor MA is disposed on a center line CL that passes through the central part between the pair of left and right front wheels WF in plan view and extends in the vehicle front-rear direction.

Furthermore, the rotor 46A of the electric motor MA is supported by an engine constituent member forming part of the engine EA. In this embodiment, the rotor 46A is relatively rotatably supported by an end part of the crankshaft 13, which is the engine constituent member.

The rotor 46A has a motor shaft 47 that is coaxial with the crankshaft 13 and has a circular cylindrical shape. This motor shaft 47 is relatively rotatably supported by a small-radius shaft part 13b formed at the front end part of the crankshaft 13 with the intermediary of a needle bearing 48.

A gear-system power transmission mechanism 49A that transmits rotational power from the rotor 46A to the first main shaft 34 is provided between the rotor 46A of the electric motor MA and the first main shaft 34 of the transmission T. This power transmission mechanism 49A is composed of a drive gear 50 coaxially fixed to the rotor 46A to rotate with this rotor 46A and a driven gear 51 that meshes with this drive gear 50 and is fixed to the front end part of the first main shaft 34 in the vehicle front-rear direction. The driven gear 51 is formed with the same radius as the drive gear 50. The power transmission mechanism 49A is housed in the transmission chamber 24 together with the electric motor MA.

Part of the driven gear 51 of the power transmission mechanism 49A soaks in lubricating oil in the transmission chamber 24. In addition, the dynamic oil level of the lubricating oil of the transmission chamber 24 including the motor housing part 24a is a level shown by L1 in FIG. 5 and FIG. 6, whereas the static oil level is a level shown by L2 in FIG. 5 and FIG. 6. The rotor 46A of the electric motor MA housed in the transmission chamber 24 is disposed on the upper side relative to the highest oil level of the lubricating oil in the transmission chamber 24, i.e. the static oil level L2, as shown in FIG. 5 and FIG. 6.

By the way, the front-two-wheel motor-tricycle in this embodiment can swing to the left and right. For example, in the state in which the front-two-wheel motor-tricycle swings to the right side to a maximum extent, the dynamic oil level of the lubricating oil in the transmission chamber 24 is at a level shown by L3 in FIG. 6 and the static oil level is at a level shown by L4 in FIG. 6. However, the rotor 46A is disposed on the upper side relative to the highest oil level when the front-two-wheel motor-tricycle swings to the right side, i.e. the static oil level L4. Furthermore, also when the front-two-wheel motor-tricycle swings to the left side, the rotor 46A similarly exists on the upper side relative to the highest oil level of the lubricating oil in the transmission chamber 24.

Furthermore, a pair of couplers 52A and 52B for guiding leads continuous with the stator 45 of the electric motor MA from the motor case 30 to the outside are disposed to protrude outwardly from the sidewall of the motor case 30. These couplers 52A and 52B are disposed on the upper side relative to the highest oil level of the lubricating oil in the transmission chamber 24, i.e. the static oil level L2.

Referring to FIG. 6 particularly, rotational power is transmitted from the part close to the front end part of the crankshaft 13 in the vehicle front-rear direction to a camshaft 53L rotatably supported by the left cylinder head 17L of the left cylinders in the engine main body 14A and a camshaft 53R rotatably supported by the right cylinder head 17R of the right cylinders in the engine main body 14A. In addition, the power is transmitted to the camshafts 53L and 53R via timing transmission mechanisms 54L and 54R that transmit power subjected to a reduction to ½ of the rotation speed of the crankshaft 13. The timing transmission mechanisms 54L and 54R are composed of driven sprockets 55L and 55R fixed to the camshafts 53L and 53R, drive sprockets 56L and 56R having the radius equal to ½ of the radius of these driven sprockets 55L and 55R, and cam chains 57L and 57R wound on the drive sprockets 56L and 56R and the driven sprockets 55L and 55R.

To set the radius of the driven sprockets 55L and 55R as small as possible and make the left and right cylinder heads 17L and 17R compact, the radius of the drive sprockets 56L and 56R needs to be decreased. However, the front end part of the crankshaft 13 is formed with a comparatively-large radius in order to relatively rotatably support the rotor 46A of the electric motor MA. For this reason, when the drive sprockets 56L and 56R are directly fixed to the crankshaft 13, an increase in the radius of the drive sprockets 56L and 56R and hence the driven sprockets 55L and 55R is caused. Therefore, in this embodiment, the drive sprockets 56L and 56R formed with a comparatively-small radius are disposed on both left and right sides of the crankshaft 13 and are rotatably supported by the crankcase 15A. Furthermore, with driven gears 58L and 58R that rotate with these drive sprockets 56L and 56R, a drive gear 59 fixed between the bearing caps 20 and 22 at the front part of the crankshaft 13 in the vehicle front-rear direction is meshed. This drive gear 59 is formed with the same radius as the driven gears 58L and 58R.

Moreover, on the crankcase 15A, a water pump 60 for circulating cooling water in the engine main body 14A is disposed. To this water pump 60, rotational power is transmitted from the crankshaft 13 via a drive gear 61 provided on the crankshaft 13 adjacent to the bearing cap 20 and a driven gear 62 that meshes with the drive gear 61.

In such a hybrid power unit PA, when the rear wheel WR is driven by power of only the electric motor MA, the first and second clutches 42 and 43 of the clutch system C are both set to the disconnected state and the power is transmitted from the power transmission mechanism 49A to the first main shaft 34. The power is transmitted from the first main shaft 34 to the countershaft 36 via a gear train solely established among the gear trains of the odd shift stages provided between the first main shaft 34 and the countershaft 36, i.e. the first gear train G1, the third gear train G3, the fifth gear train G5, and the seventh gear train G7.

Furthermore, when the rear wheel WR is driven by power of only the engine EA, one of the first and second clutches 42 and 43 of the clutch system C is set to the connected state and one of the first to seventh gear trains G1 to G7 is selectively established. In this case, when the first clutch 42 is set to the connected state and one of the first gear train G1, the third gear train G3, the fifth gear train G5, and the seventh gear train G7 is selected, the electric motor MA is subjected to zero-torque control in order to prevent the occurrence of dragging of the electric motor MA. More specifically, the rotation speed of the electric motor MA is controlled to match the rotation speed of the first main shaft 34.

Next, the operation of this first embodiment will be described. The transmission T is housed in the transmission chamber 24 formed in the crankcase 15A below the crankshaft 13 of the engine EA. Furthermore, the first clutch 42 of the clutch system C that enables switching between a connection and a disconnection of power transmission is provided between the crankshaft 13 and the first main shaft 34 included in the transmission T. Moreover, the electric motor MA, that is rendered incapable of direct power transmission from and to the crankshaft 13 and is disposed on the upper side relative to the first main shaft 34 of the transmission T, can transmit rotational power from the rotor 46A of the electric motor MA to the first main shaft 34. Therefore, by transmitting power from the electric motor MA to the first main shaft 34, in the state wherein power transmission between the crankshaft 13 and the first main shaft 34 is blocked, the occurrence of dragging of the engine EA at the time of operation by the electric motor MA alone can be avoided. In addition, when a connection is established between the crankshaft 13 and the first main shaft 34 and an operation is carried out by the engine EA alone, it is also possible to prevent the generation of a cogging torque on the side of the electric motor MA by carrying out zero-torque control of the electric motor MA. Thus, it is possible to operate the electric motor MA and the engine EA alone with an alleviation of the load.

Furthermore, the electric motor MA is housed in the transmission chamber 24 and the rotor 46A of this electric motor MA is disposed on the upper side relative to the highest oil level L2 of the lubricating oil in the transmission chamber 24. Thus, lubrication of the power transmission mechanism 49A provided between the electric motor MA and the first main shaft 34 is enabled and the need for a wall that isolates the electric motor MA from the transmission chamber 24 is eliminated. This can avoid an increase in the size of the hybrid power unit PA in the direction along the axis line of the crankshaft 13, and avoid stirring of the lubricating oil by the rotor 46A, which can alleviate the load of the electric motor MA.

In addition, the electric motor MA is disposed on the same axis as the crankshaft 13 extending in the vehicle front-rear direction. Thus, the width of the hybrid power unit PA along the vehicle width direction is suppressed to a small width, which allows the front-two-wheel motor-tricycle to be made compact.

Moreover, on the vehicle body frame F of the front-two-wheel motor-tricycle having the pair of left and right front wheels WF, the electric motor MA is mounted so as to be located on the center line CL that passes through the central part between the pair of left and right front wheels WF in a plan view and extends in the vehicle front-rear direction and is located on the front side of the crankshaft 13 in the vehicle front-rear direction. Thus, the electric motor MA can be cooled by a flow of air when the front-two-wheel motor-tricycle is operated.

The rotor 46A is disposed on the upper side relative to the highest oil level L4 in the transmission chamber 24 when the front-two-wheel motor-tricycle swings to the left and right. This can avoid stirring of the lubricating oil by the rotor 46A when the front-two-wheel motor-tricycle swings to the left and right, and can alleviate the load of the electric motor MA.

In addition, the rotor 46A is supported by an engine constituent member forming part of the engine EA. Thus, the rotor 46A as a heavy component can be supported by the engine constituent member having a high rigidity. In addition, the engine constituent member is the crankshaft 13 in this first embodiment and the motor shaft 47, coaxially continuous with the rotor 46A to rotate with this rotor 46A, is relatively rotatably supported by an end part of the crankshaft 13. Thus, with the motor shaft 47 supported by the crankshaft 13 and having a particularly-high rigidity, the rotor 46A can be supported by a simple configuration without the necessity to additionally provide a support member.

Moreover, the motor shaft 47 is relatively rotatably supported by the front end part of the crankshaft 13 extending in the vehicle front-rear direction and thus the electric motor MA can be cooled by a flow of air.

In addition, the stator 45 of the electric motor MA is fixed to the motor case 30 joined to the crankcase 15A with the intermediary of the front part extension case 29, and the couplers 52A and 52B, for guiding the leads continuous with the stator 45 from the motor case 30 to the outside, are disposed to protrude outwardly from the sidewall of the motor case 30 on the upper side relative to the highest oil level L2 of the lubricating oil in the transmission chamber 24. Thus, leakage of the lubricating oil from between the motor case 30 and the couplers 52A and 52B can be avoided.

Figure 7:
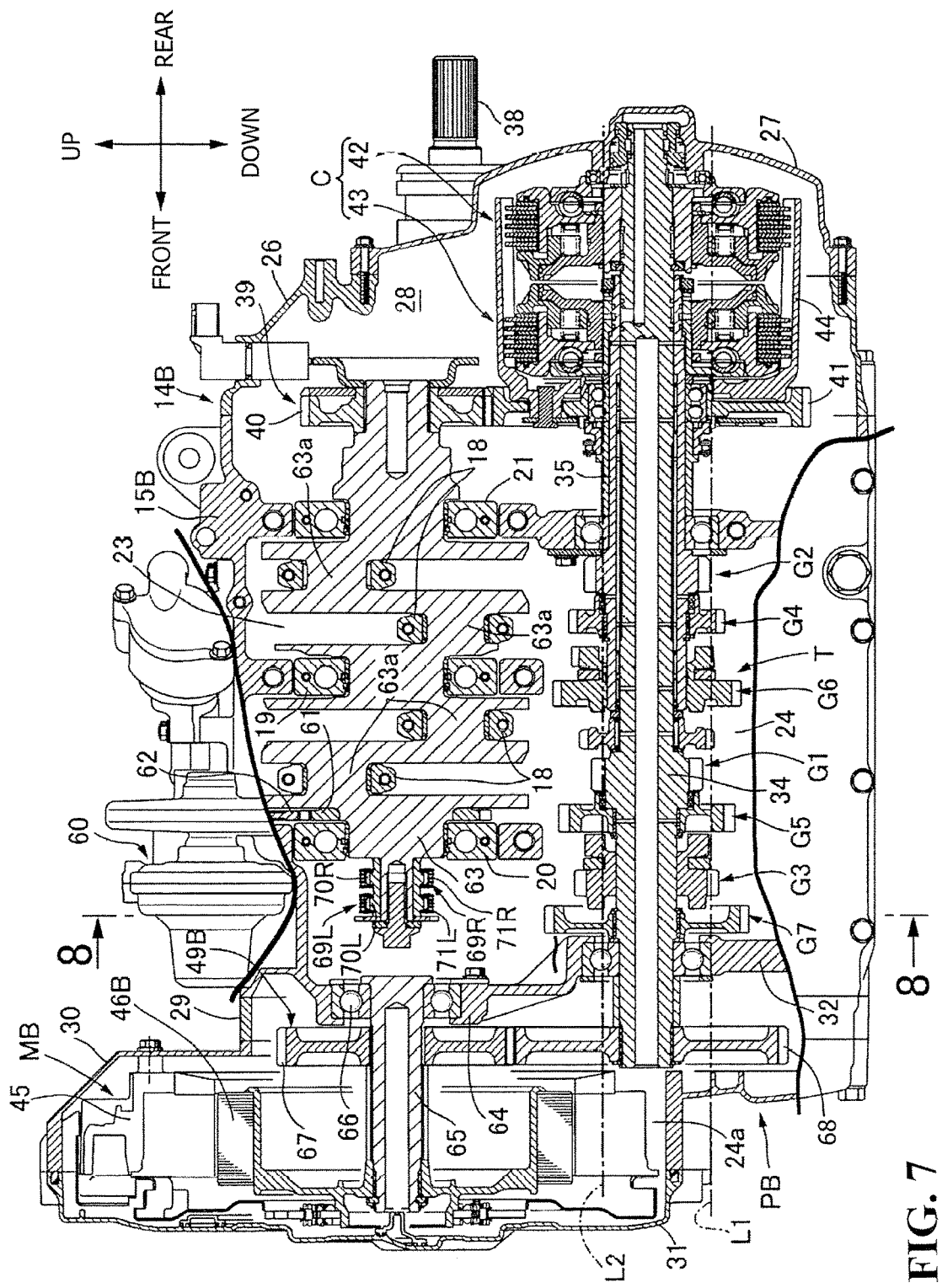
FIG. 7 is a sectional view corresponding to FIG. 5 regarding a second embodiment.
Figure 8:
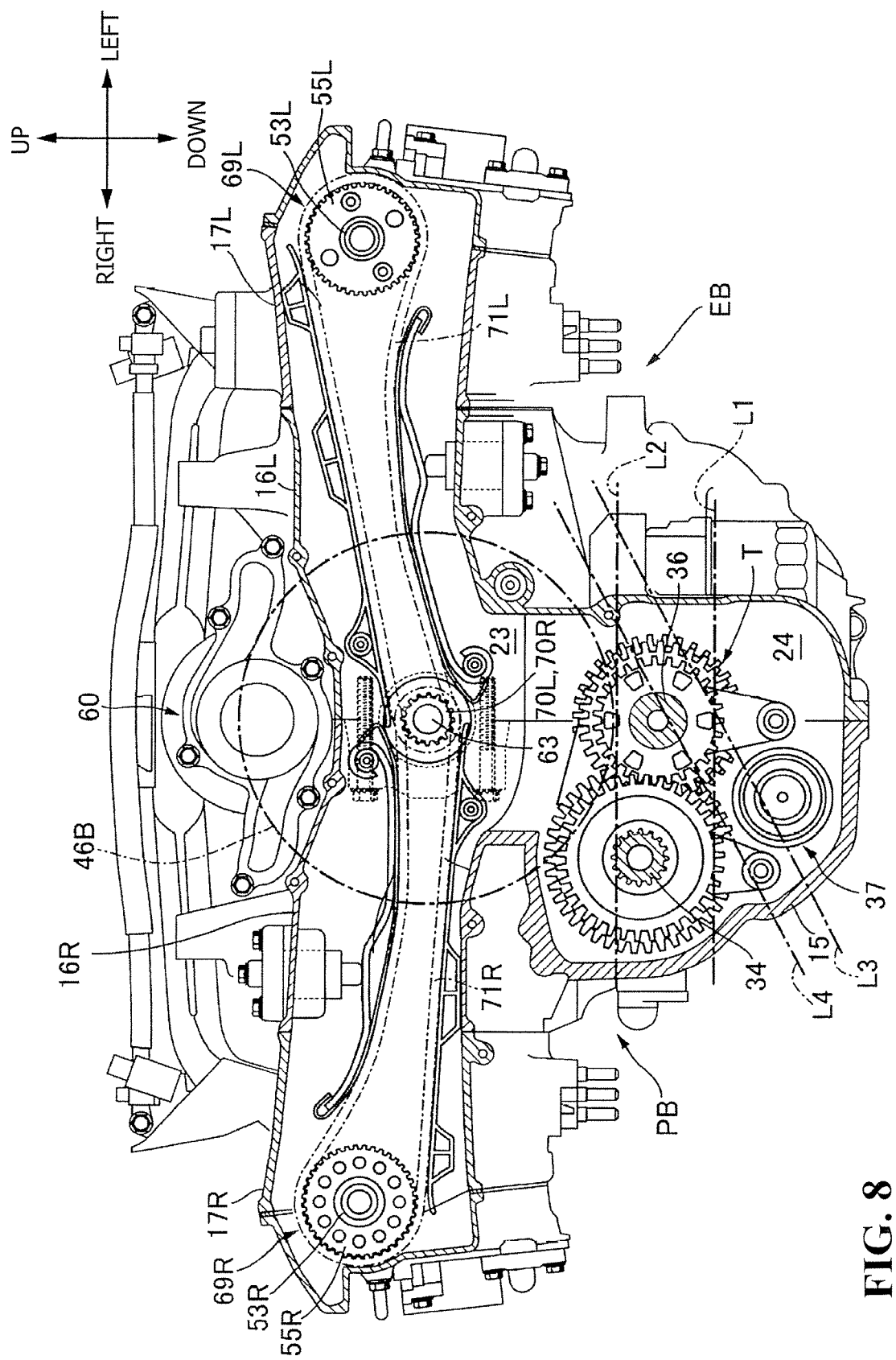
FIG. 8 is a sectional view along line 8-8 in FIG. 7.

A second embodiment of the present invention will be described with reference to FIG. 7 and FIG. 8. Parts corresponding to the first embodiment shown in FIG. 1 to FIG. 6 are given the same reference symbols and are diagrammatically represented. Thus, a detailed description thereof is omitted.

A hybrid power unit PB is composed of an engine EB having a crankcase 15B that rotatably supports a crankshaft 63 extending in the vehicle front-rear direction, a transmission T housed in the crankcase 15B below the crankshaft 63, a clutch system C that enables switching between a connection and a disconnection of power transmission from the crankshaft 63 to the transmission T, and an electric motor MB.

The engine EB is a horizontally-opposed four-cylinder engine in this embodiment. An engine main body 14B thereof includes the crankcase 15B, a left cylinder block 16L that protrudes from the crankcase 15B to the left side in the vehicle width direction, a left cylinder head 17L that sandwiches this left cylinder block 16L with the crankcase 15B, a right cylinder block 16R that protrudes from the crankcase 15B to the right side in the vehicle width direction, and a right cylinder head 17R that sandwiches the right cylinder block 16R with the crankcase 15B. Each of the pair of the left cylinder block 16L and the left cylinder head 17L and the pair of the right cylinder block 16R and the right cylinder head 17R is configured to include two cylinders.

Similarly to the crankshaft 13 in the first embodiment, the crankshaft 63 is formed to have four crankpins 63a adjacent in the axial direction and is rotatably supported by bearing caps 19, 20, and 21 and the crankcase 15B.

In the crankcase 15B, a crank chamber 23 is formed that houses a large part of the crankshaft 63 and a transmission chamber 24 is disposed below the crankshaft 63 to lead to the crank chamber 23.

Furthermore, a motor housing part 24a forming part of the transmission chamber 24 is formed by the crankcase 15B, a front part extension case 29, a motor case 30, and a motor cover 31.

The electric motor MB has a stator 45 fixed to the motor case 30 and a rotor 46B disposed in the stator 45. The electric motor MB is disposed on the upper side relative to a first main shaft 34 of the transmission T and in the motor housing part 24a of the transmission chamber 24 while being rendered incapable of direct power transmission from and to the crankshaft 63.

The electric motor MB is disposed on the same axis as the crankshaft 63 extending in the vehicle front-rear direction and on the front side of the crankshaft 63 in the vehicle front-rear direction. In addition, the rotor 46B of the electric motor MB is supported by an engine constituent member forming part of the engine EB. In this embodiment, the engine constituent member is the crankcase 15B and a motor shaft 65 coaxially continuous with the rotor 46B to rotate with this rotor 46B is rotatably supported by a rotor support part 64 formed in the crankcase 15B at a position separated from the front end part of the crankshaft 63 in the axial direction with the intermediary of a ball bearing 66.

A gear-system power transmission mechanism 49B that transmits rotational power from the rotor 46B to the first main shaft 34 is provided between the rotor 46B of the electric motor MB and the first main shaft 34 of the transmission T. This power transmission mechanism 49B is composed of a drive gear 67 coaxially fixed to the rotor 46B to rotate with this rotor 46B and a driven gear 68 that meshes with this drive gear 67 and is fixed to the front end part of the first main shaft 34 in the vehicle front-rear direction. The driven gear 68 is formed with the same radius as the drive gear 67. The power transmission mechanism 49B is housed in the transmission chamber 24 together with the electric motor MB.

Part of the driven gear 68 of the power transmission mechanism 49B soaks in lubricating oil in the transmission chamber 24. In addition, as shown in FIG. 8, the rotor 46B of the electric motor MB housed in the transmission chamber 24 is disposed on the upper side relative to the highest oil level of the lubricating oil in the transmission chamber 24, i.e. a static oil level L2.

Rotational power is transmitted from the part close to the front end part of the crankshaft 63 in the vehicle front-rear direction to a camshaft 53L rotatably supported by the left cylinder head 17L of the left cylinders in the engine main body 14B and a camshaft 53R rotatably supported by the right cylinder head 17R of the right cylinders in the engine main body 14B. In addition, the power is transmitted to the camshafts 53L and 53R via timing transmission mechanisms 69L and 69R that transmit power subjected to a reduction to ½ of the rotation speed of the crankshaft 63. The timing transmission mechanisms 69L and 69R are composed of driven sprockets 55L and 55R fixed to the camshafts 53L and 53R, drive sprockets 70L and 70R having the radius equal to ½ of the radius of these driven sprockets 55L and 55R, and cam chains 71L and 71R wound on the drive sprockets 70L and 70R and the driven sprockets 55L and 55R.

The front end part of the crankshaft 63 is disposed separately from the rotor 46B of the electric motor MB in the axial direction and is formed with a comparatively-small radius. For this reason, although the drive sprockets 70L and 70R are directly fixed to the crankshaft 63, the drive sprockets 70L and 70R can be formed with a comparatively-small radius and the drive sprockets 70L and 70R are fixed to the front end part of the crankshaft 63.

According to this second embodiment, the motor shaft 65 coaxially continuous with the rotor 46B of the electric motor MB to rotate with this rotor 46B is rotatably supported by the rotor support part 64 formed in the crankcase 15B at a position separated from one end part of the crankshaft 63 in the axial direction. Thus, the rotor 46B as a heavy component can be supported by the crankcase 15B having a particularly-high rigidity.

In addition, the drive sprockets 70L and 70R that drive the cam chains 71L and 71R are fixed to the front end part of the crankshaft 63 and the front end part of the crankshaft 63 can be formed with a small radius by being rendered irrelevant to the support of the rotor 46B. This allows the drive sprockets 70L and 70R provided at the front end part of the crankshaft 63 to have a small radius. Thus, it is possible to avoid an increase in the radius of the driven sprockets 55L and 55R due to an increase in the radius of the drive sprockets 70L and 70R. The hybrid power unit PB can be made compact. Thus, the front-two-wheel motor-tricycle can be made compact.

Although the embodiments of the present invention are described above, the present invention is not limited to the above-described embodiments and various design changes can be made without departing from the present invention set forth in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid power unit that is mounted on a vehicle body frame of a saddle vehicle, comprising:
   an engine having a crankcase for rotatably supporting a crankshaft;
   a transmission includes a transmission shaft parallel to the crankshaft and is housed in a transmission chamber formed in the crankcase below the crankshaft;
   a clutch system for enabling a switching between a connection and a disconnection of a power transmission from the crankshaft to the transmission shaft; and
   an electric motor capable of transmitting rotational power to the transmission shaft;
   wherein the electric motor, rendered incapable of direct power transmission from and to the crankshaft, is housed in the transmission chamber in such a manner as to be allowed to transmit rotational power from a rotor of the electric motor to the transmission shaft; and
   the rotor is disposed on an upper side relative to a highest oil level of lubricating oil in the transmission chamber.

2. The hybrid power unit according to claim 1, wherein the electric motor is disposed on the same axis as the crankshaft extending in a vehicle front-rear direction.

3. The hybrid power unit according to claim 2, wherein the electric motor is mounted on the vehicle body frame of the saddle vehicle having a pair of left and right front wheels in such a manner as to be located on a center line that passes through a central part between the pair of left and right front wheels in a plan view and extends in the vehicle front-rear direction and is located on a front side of the crankshaft in the vehicle front-rear direction.

4. The hybrid power unit according to claim 3, wherein the saddle vehicle is a front-two-wheel motor-tricycle that is swingable to left and right, and the rotor is disposed on the upper side relative to a highest oil level in the transmission chamber when the front-two-wheel motor-tricycle swings.

5. The hybrid power unit according to claim 1, wherein the rotor is supported by an engine constituent member forming part of the engine.

6. The hybrid power unit according to claim 2, wherein the rotor is supported by an engine constituent member forming part of the engine.

7. The hybrid power unit according to claim 3, wherein the rotor is supported by an engine constituent member forming part of the engine.

8. The hybrid power unit according to claim 4, wherein the rotor is supported by an engine constituent member forming part of the engine.

9. The hybrid power unit according to claim 5, wherein the engine constituent member is the crankshaft, and a motor shaft coaxially continuous with the rotor to rotate with the rotor is relatively rotatably supported by an end part of the crankshaft.

10. The hybrid power unit according to claim 9, wherein the motor shaft is relatively rotatably supported by a front end part of the crankshaft extending in the vehicle front-rear direction.

11. The hybrid power unit according to claim 5, wherein the engine constituent member is the crankcase, and a motor shaft coaxially continuous with the rotor to rotate with the rotor is rotatably supported by a rotor support part formed in the crankcase at a position separated from one end part of the crankshaft in an axial direction, and drive sprockets that drive cam chains are fixed to the one end part of the crankshaft.

12. The hybrid power unit according to claim 1, wherein a stator of the electric motor is fixed to a motor case joined to the crankcase, and couplers for guiding leads continuous with the stator from the motor case to outside are disposed to protrude outwardly from a sidewall of the motor case on the upper side relative to the highest oil level of the lubricating oil in the transmission chamber.

13. The hybrid power unit according to claim 2, wherein a stator of the electric motor is fixed to a motor case joined to the crankcase, and couplers for guiding leads continuous with the stator from the motor case to outside are disposed to protrude outwardly from a sidewall of the motor case on the upper side relative to the highest oil level of the lubricating oil in the transmission chamber.

14. The hybrid power unit according to claim 3, wherein a stator of the electric motor is fixed to a motor case joined to the crankcase, and couplers for guiding leads continuous with the stator from the motor case to outside are disposed to protrude outwardly from a sidewall of the motor case on the upper side relative to the highest oil level of the lubricating oil in the transmission chamber.

15. The hybrid power unit according to claim 4, wherein a stator of the electric motor is fixed to a motor case joined to the crankcase, and couplers for guiding leads continuous with the stator from the motor case to outside are disposed to protrude outwardly from a sidewall of the motor case on the upper side relative to the highest oil level of the lubricating oil in the transmission chamber.

16. A hybrid power unit adapted to be mounted on a vehicle body frame of a saddle vehicle, comprising:
    an engine having a crankcase for rotatably supporting a crankshaft;
    a transmission including a transmission shaft parallel to the crankshaft, said transmission being housed in a transmission chamber formed in the crankcase below the crankshaft;
    a clutch system for enabling a switching between a connection and a disconnection of a power transmission from the crankshaft to the transmission shaft; and
    an electric motor for selectively transmitting rotational power to the transmission shaft, said electric motor being selectively rendered incapable of direct power transmission from and to the crankshaft and being housed in the transmission chamber to allow for selective rotational power to be transmitted from a rotor of the electric motor to the transmission shaft; and
    said rotor being disposed on an upper side relative to a highest oil level of lubricating oil in the transmission chamber.

17. The hybrid power unit according to claim 16, wherein the electric motor is disposed on the same axis as the crankshaft extending in a vehicle front-rear direction.

18. The hybrid power unit according to claim 17, wherein the electric motor is mounted on the vehicle body frame of the saddle vehicle having a pair of left and right front wheels in such a manner as to be located on a center line that passes through a central part between the pair of left and right front wheels in a plan view and extends in the vehicle front-rear direction and is located on a front side of the crankshaft in the vehicle front-rear direction.

19. The hybrid power unit according to claim 18, wherein the saddle vehicle is a front-two-wheel motor-tricycle that is swingable to left and right, and the rotor is disposed on the upper side relative to a highest oil level in the transmission chamber when the front-two-wheel motor-tricycle swings.

20. The hybrid power unit according to claim 16, wherein the rotor is supported by an engine constituent member forming part of the engine.

* * * * *